United States Patent
Nasri et al.

(10) Patent No.: US 10,689,778 B2
(45) Date of Patent: Jun. 23, 2020

(54) PROCESS AND APPARATUS FOR THE PRODUCTION OF A LOW-SHRINKAGE ALIPHATIC POLYAMIDE YARN, AND LOW-SHRINKAGE YARN

(71) Applicants: TRUETZSCHLER GMBH & CO. KG, Moenchengladbach (DE); DSM IP ASSETS B.V., Te Heerlen (NL)

(72) Inventors: Lassad Nasri, Winterthur (CH); Roman Stepanyan, AA Echt (NL); Martinus Joseph Maria Keulers, AA Echt (NL)

(73) Assignees: TRUETZSCHLER GMBH & CO. KG, Moenchengladbach (DE); DSM IP ASSETS B.V., Te Heerlen (NL)

( * ) Notice: Subject to any disclaimer, the term of this patent is extended or adjusted under 35 U.S.C. 154(b) by 206 days.

(21) Appl. No.: 15/537,866

(22) PCT Filed: Dec. 5, 2015

(86) PCT No.: PCT/EP2015/002455
§ 371 (c)(1),
(2) Date: Jun. 19, 2017

(87) PCT Pub. No.: WO2016/096102
PCT Pub. Date: Jun. 23, 2016

(65) Prior Publication Data
US 2017/0327972 A1    Nov. 16, 2017

(30) Foreign Application Priority Data
Dec. 19, 2014    (DE) .......... 10 2014 119 184

(51) Int. Cl.
*D01D 5/16*    (2006.01)
*C08G 69/46*    (2006.01)
(Continued)

(52) U.S. Cl.
CPC ............ *D01D 5/16* (2013.01); *C08G 69/46* (2013.01); *D01D 4/02* (2013.01); *D01F 6/60* (2013.01);
(Continued)

(58) Field of Classification Search
CPC . D01D 5/16; D01D 4/02; C08G 69/46; D01F 6/60; D02G 3/02; D02G 3/446; D02J 1/228; D02J 1/229
(Continued)

(56) References Cited

U.S. PATENT DOCUMENTS

| 5,360,667 | A | 11/1994 | Boles, Jr. et al. | |
| 7,198,843 | B2 * | 4/2007 | Kim | D01F 6/62 428/364 |

(Continued)

FOREIGN PATENT DOCUMENTS

| CN | 102505150 A | 6/2012 |
| CN | 103088453 A | 5/2013 |

(Continued)

OTHER PUBLICATIONS

International Search Report for PCT/EP2015/002455, dated Feb. 5, 2016.
(Continued)

*Primary Examiner* — Josephine L Chang
(74) *Attorney, Agent, or Firm* — FisherBroyles, LLP; Robert Kinberg

(57) ABSTRACT

A process and an apparatus for production of a low-shrinkage aliphatic polyamide fibre, in which polyamide is extruded through a spinneret to form filaments, then cooled and combined to form at least one yarn. The at least one yarn is subjected to drawing between the spinneret and a pair of inlet rolls, then in a further multi-stage drawing step is subjected to 4-fold to 6-fold drawing by pairs of draw rolls.

(Continued)

The pairs of draw rolls successively heat the yarn and at least the last pair of draw rolls has a temperature of 5° C. to 20° C. below the melting point of the yarn. The yarn is relaxed by from 6% to 10% in a subsequent at least three-stage relaxation zone and is kept in a temperature range of 5° C. to 15° C. below the melting point of the yarn, and is subsequently wound up on a reel device. The invention further relates to a yarn composed of a low-shrinkage aliphatic polyamide fibre.

6 Claims, 1 Drawing Sheet

(51) Int. Cl.
  *D01D 4/02* (2006.01)
  *D01F 6/60* (2006.01)
  *D02G 3/02* (2006.01)
  *D02G 3/44* (2006.01)
  *D02J 1/22* (2006.01)
(52) U.S. Cl.
  CPC ............. *D02G 3/02* (2013.01); *D02G 3/446* (2013.01); *D02J 1/228* (2013.01); *D02J 1/229* (2013.01)
(58) Field of Classification Search
  USPC .......................................... 528/335
  See application file for complete search history.

(56) References Cited

U.S. PATENT DOCUMENTS

| | | | |
|---|---|---|---|
| 2003/0219595 A1* | 11/2003 | Samant | D01D 5/092 428/373 |
| 2006/0083874 A1 | 4/2006 | Yu et al. | |
| 2009/0124149 A1* | 5/2009 | Barnes | D01D 5/16 442/59 |

FOREIGN PATENT DOCUMENTS

| | | |
|---|---|---|
| EP | 1 666 647 B1 | 2/2008 |
| EP | 2 205 780 B1 | 5/2012 |
| JP | 2003020349 A * | 1/2003 |
| KR | 0168633 B1 | 1/1999 |
| KR | 10-0462924 B1 | 12/2004 |
| WO | 2013/013332 A1 | 1/2013 |

OTHER PUBLICATIONS

Written Opinion for PCT/EP2015/002455, dated Feb. 5, 2016.
Office Action from Korean Patent Application No. 10-2017-7020242 (English translation only).

* cited by examiner

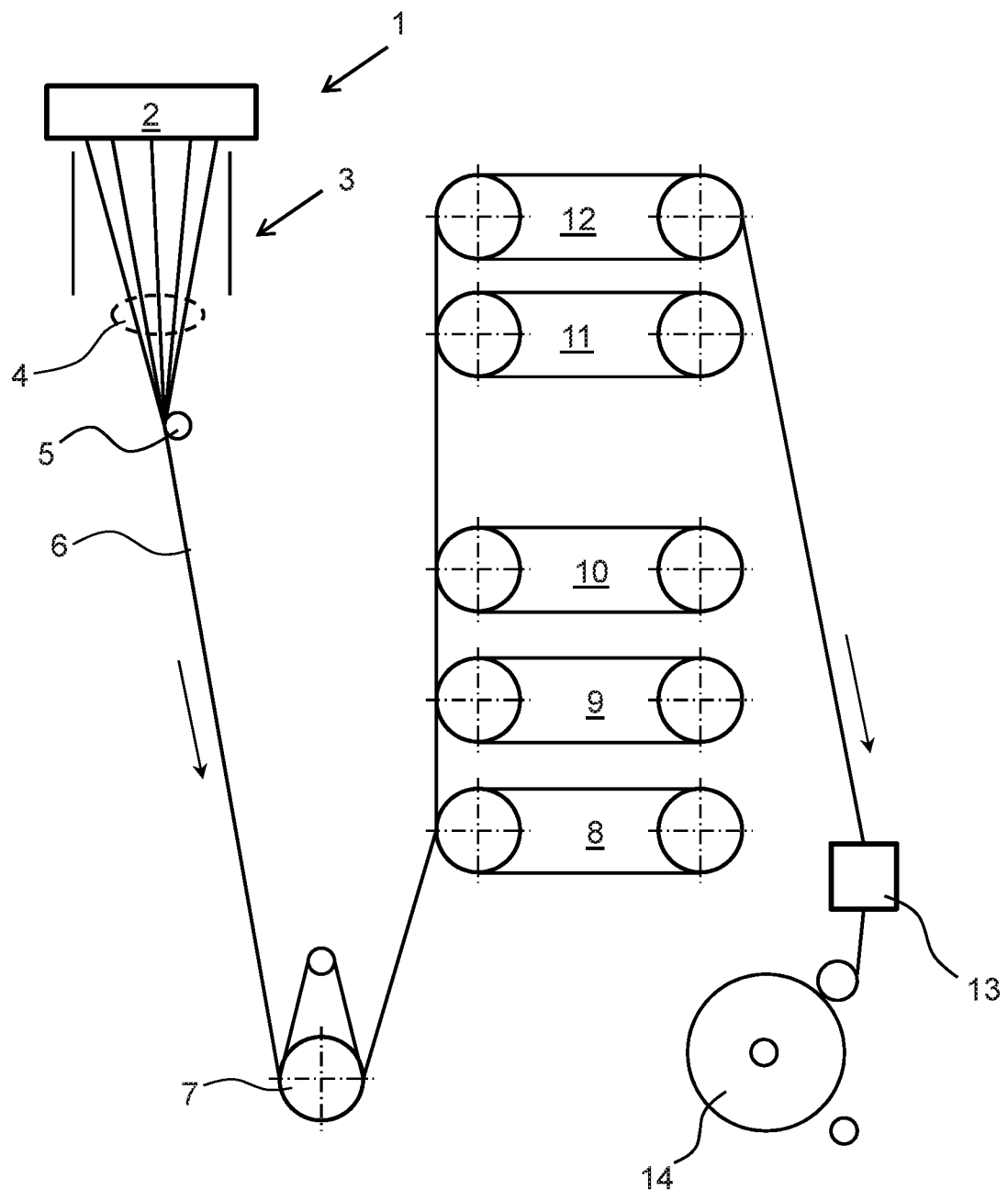

PROCESS AND APPARATUS FOR THE PRODUCTION OF A LOW-SHRINKAGE ALIPHATIC POLYAMIDE YARN, AND LOW-SHRINKAGE YARN

CROSS-REFERENCE TO RELATED APPLICATIONS

This application is a U.S. National Stage of International Patent Application No. PCT/EP2015/002455 filed Dec. 5, 2015, designating the United States and claiming benefit of German Patent Application No. 10 2014 119 184.6 filed Dec. 19, 2014.

BACKGROUND OF THE INVENTION

The invention relates to a process and an apparatus for the production of a low-shrinkage aliphatic polyamide yarn, in which polyamide is extruded through a spinneret to form filaments, then cooled and combined to form at least one yarn, the yarn being subjected to drawing in a multi-stage process and then relaxed. The invention further relates to a low-shrinkage aliphatic polyamide yarn.

High-tenacity polyamide yarns are suitable for a large number of technical purposes, such as, for example, for use as reinforcement in tyres or conveyor belts, for use in plastics-coated materials and in cables or for the production of airbags. In order to produce such yarns economically, the product properties should have a combination of high tenacity and low shrinkage on heating. Especially desirable properties are a tenacity of at least 80 cN/tex and a hot air shrinkage of less than about 5.0%. That combination of properties is difficult to achieve, especially in a combined spinning and drawing process at high speed in industrial mass production.

The starting material used for the production of airbag yarn is usually polyamide 6.6 or PA6.6, an aliphatic polyamide composed of monomeric units derived from hexamethylenediamine and adipic acid, which has a melting point of around 260° C.

The use of the significantly more readily available polyamide 6, a polyamide composed of monomeric units derived from caprolactam, as starting material for an airbag yarn had the disadvantage of a relatively low melting point, meaning that on deployment of the airbag the yarn could more easily be destroyed by the flying sparks. That was the case in the past, because high-temperature inflation systems were used. Since the deployment of airbags nowadays takes place at lower temperatures, the use of polyamide 6 is now a possibility.

EP 2 205 780 B1 describes a spin-draw process for the production of airbag yarn from PA 6.6, wherein a multifilament yarn is created from molten polyamide by means of a spinneret, which multifilament yarn is first subjected to multi-stage drawing at a temperature of 160° C. to 245° C., then relaxed and subsequently wound up under tension. That process is not suitable for PA 6, because the holding temperature during the drawing is above the melting point of PA 6. The process is not suitable for creating a yarn having suitable hot-air shrinkage from PA6.

EP 1 666 647 B1 describes a process for the production of airbag yarn from polyamide, wherein a multifilament yarn composed of polyamide 6.6 is produced by means of meltextrusion, the yarn is subjected to a high degree of drawing at low temperature in a first step and to a low degree of drawing at high temperature in a second step, then relaxed and subsequently wound up. That process is likewise unsuitable for processing PA 6 on account of the high temperature, since it uses a drawing temperature of up to 250° C. and a relaxation temperature of up to 260° C. Furthermore, the production of airbag yarn from PA6.6 in accordance with the above-mentioned processes is unsatisfactory, because the values for the tenacity and the hot-air shrinkage are subject to too much variation and do not yield the required values.

SUMMARY OF THE INVENTION

An object of the present invention is to provide a process and an apparatus with which a polyamide can be reliably further processed to form a yarn in a spin-draw process so that it has a tenacity of at least 80 cN/tex and a hot air shrinkage of a maximum of 6.5%. Hot-air shrinkage is hereby understood to be a value measured in accordance with ASTM D4974-04 at 177° C. for 2 minutes, The above and other objects are met by a process for the production of a low-shrinkage aliphatic polyamide yarn, in which the polyamide is extruded through a spinneret to form filaments, then cooled and combined to form at least one yarn, wherein the at least one yarn undergoes first drawing between the spinneret and a pair of inlet rolls, then in a further multi-stage drawing step is subjected to 4-fold to 6-fold drawing by means of pairs of draw rolls, the pairs of draw rolls successively heating the yarn and at least the last pair of draw rolls having a temperature of 5° C. to 20° C. below the melting point of the yarn, the yarn being relaxed by from 4% to 10% in a subsequent at least three-stage relaxation zone and being kept in a temperature range of 5° C. to 15° C. below the melting point of the yarn, and subsequently being wound up on a reel device.

According to the invention, a first multi-stage drawing step is followed by an at least three-stage relaxation step, so that the desired tenacity values are achievable even for a PA6 or a comparable polyamide. In respect of an airbag yarn composed of PA 6.6, this results in a stable production process in which the required values are reliably achieved.

In that process, the temperature in the last drawing stage is 5° C. to 20° C. slightly below the melting point of the yarn. During the at least three-stage relaxation, the temperature is likewise kept just below the melting point of the yarn, namely 5° C. to 15° C., preferably 5° C. to 8° C. below the melting point of the yarn.

Accordingly, the polymer chains (molecules) of the polyamide are able to stabilise, resulting in enhanced tenacity values unattainable hitherto with a yarn composed, for example, of PA6.

Due to the fact that the relaxation of the yarn between the third pair of draw rolls and at least two further pairs of draw rolls is effected at a temperature slightly below the melting point, rapid and high consolidation of the molecule chains of the polyamide is achieved.

In an embodiment, the subsequent relaxation between the last pair of draw rolls and the reel device also provides for sufficient stabilisation of the polymer chains. The utilisation of the reel device for relaxation of the yarn makes it possible to dispense with a further pair of draw rolls.

According to the invention the aliphatic polyamide comprises at least 90% by weight, preferably at least 95% by weight, especially preferably at least 98% by weight, monomeric units derived from caprolactam, or monomeric units derived from hexamethylenediamine and adipic acid (AH salt), or mixtures thereof. The weight percentage is given with respect to the total weight of polyamides. The polyamide may further contain dyes, stabilisers etc.

Monomeric unit derived from caprolactam is also known by the chemical formula (1):

—HN(CH$_2$)$_5$CO—                          (1)

Monomeric unit derived from hexamethylene diamine and adipic acid is also known by the chemical formula (2), and may also be derived from the salt of hexamethylene diamine and adipic acid:

—HN(CH$_2$)$_6$NHCO(CH$_2$)$_4$CO—            (2)

The apparatus according to the invention for the production of a low-shrinkage aliphatic polyamide yarn comprises at least one spinneret by means of which polyamides are extruded to form filaments, then cooled and combined to form at least one yarn, there being arranged after the spinneret a first pair of inlet rolls for the first drawing of the yarn, which is followed by a second multi-stage drawing step, subsequently followed by an at least three-stage relaxation zone and a reel device.

Due to the fact that the drawing step is followed solely by successive relaxation up to the reel device, the molecules are able to undergo a longer period of alignment and stabilisation. The integration of the reel device for relaxation of the yarn makes it possible to dispense with a pair of draw rolls, with the result that the system can be more advantageously and compactly constructed.

In an embodiment, the multi-stage second drawing step comprises three pairs of heatable draw rolls which are in the form of duo rolls.

The problem is likewise solved by a thread composed of a low-shrinkage aliphatic polyamide fibre, produced from a polyamide which comprises a composition of at least 90% by weight, preferably at least 95% by weight, especially preferably at least 98% by weight, monomeric units derived from caprolactam, having a tensile strength of at least 80 cN/tex with a hot-air shrinkage of 1.0 to 6.5% in accordance with ASTM D4974-04 at 177° C. for 2 minutes.

A further solution to the problem is provided by a low-shrinkage aliphatic polyamide yarn, produced from a polyamide which has a composition of at least 90% by weight, preferably at least 95% by weight, especially preferably at least 98% by weight, monomeric units derived from hexamethylenediamine and adipic acid (AH salt), or mixtures thereof, having a tensile strength of at least 80 cN/tex with a hot-air shrinkage of less than 4% in accordance with ASTM D4974-04 at 177° C. for 2 minutes.

Such a yarn has the advantage that it is very simple to produce by the process described above and has a tensile strength of at least 80 cN/tex, preferably of at least 82 cN/tex, especially preferably of at least 84 cN/tex.

The determination of the glass transition temperature and the melting temperature of the yarn composed of polyamide is effected in accordance with ASTM D 3418-03. Both glass transition temperature and melting temperature are measured in a temperature scan at 10° C./min.

BRIEF DESCRIPTION OF THE DRAWINGS

The invention is explained in greater detail with reference to the accompanying drawing, wherein:

FIG. 1 is a diagrammatic view of an apparatus according to the invention for the production of a yarn.

DETAILED DESCRIPTION OF THE INVENTION

FIG. 1 shows a diagrammatic view of an embodiment of an apparatus for the production of an endless yarn from a synthetic polyamide melt. Using a spinning device 1, a multiplicity of filament strands 4 are extruded at a temperature of 40° to 70° C. above the melting temperature of the polyamide used. The spinning device 1 comprises a spinneret 2 by means of which the individual filaments of the filament strand are formed. The filament strands 4 are fed from the spinneret 2 at a specific speed to a quench duct 3 and cooled to a temperature below the glass transition temperature of the yarn, for example below 50° C. in the case of PA6. The cooling is usually effected by blowing cooled quenching air over the filament strands 4. The filament strands 4 are then combined to form a yarn 6 and provided with a spinning lubricant 5. The yarn 6 passes to a pair of inlet rolls 7, which consists of a driven roll and a non-driven idler roll. The pair of inlet rolls 7 determines the draw-off speed of the yarn 6 from the quench duct 3, which in this exemplary embodiment can be 793 m/min. The difference between the spinning speed at the spinneret and the draw-off speed of the yarn from the quench duct gives the degree of drawing of the filament strands 4 in the spinning process. The filament strands 4 are drawn off by the inlet roll 7 at a speed higher than the spinning speed.

Following the pair of inlet rolls 7, the yarn 6 is guided over at least five pairs of rolls 8, 9, 10, 11, 12. The yarn 6 wraps several times around the pair of inlet rolls 7 and each of the pairs of rolls 8, 9, 10, 11, 12.

The drawing of the yarn 6 is effected in at least three stages: firstly between the pair of inlet rolls 7 and the first pair of draw rolls 8, then further between the pairs of draw rolls 8 and 9, and 9 and 10. The pairs of draw rolls 8, 9, 10 are preferably in the form of duo rolls; both rolls are driven and have substantially the same external diameter. This has the advantage that the stepwise heating of the yarn 6 takes place relatively continuously over a relatively long time, which is advantageous for the transformation of the molecule chains. The surfaces of the pairs of draw rolls 8, 9, 10 are heated by means of a heating system (not shown), for example an electrical, steam-based or fluid-based heating system, it being assumed hereinbelow that in the course of passing at least twice around the pairs of draw rolls the yarn 6 has also adopted the temperature of the pairs of draw rolls 8, 9, 10.

The region between the inlet roll 7 and the pair of draw rolls 8 forms the first draw zone in which, in accordance with exemplary embodiment 1, the yarn undergoes an increase in speed from 793 m/min to 817 m/min, passes at least twice around the draw rolls 8 and is heated to a temperature of 70° C.

The second draw zone is formed by the pairs of draw rolls 8 and 9, the yarn 6 passing around the draw rolls 9 at a speed of 2368 m/min at a temperature of 155° C.

The third draw zone is formed by the pairs of draw rolls 9 and 10, the yarn 6 passing around the draw rolls 10 at a speed of 3409 m/min at a temperature of 210° C. In accordance with this exemplary embodiment the drawing between the inlet roll 7 and the pair of draw rolls 10 is effected by the factor 4.3. The pair of draw rolls 10 in the third draw zone is operated at a temperature of 5° C. to 20° C. below the melting point of the yarn. Accordingly, the pair of draw rolls 10 is operated at a temperature of 200° C. to 215° C. in the case of a yarn composed of PA6 and at a temperature of 240° C. to 255° C. in the case of a yarn composed of PA6.6.

The drawing step is followed by an at least three-stage yarn relaxation step, preferably by means of duo rolls, wherein the pairs of rolls 10 and 11 form the first relaxation zone. The speed of the yarn 6 decreases stepwise and falls from 3409 m/min to 3272 m/min, the yarn being kept at a temperature slightly below the melting point. In this exemplary embodiment the temperature of the PA6 yarn is 215° C., which is 5° C. below the melting point. According to the invention, a temperature range of 5° C. to 8° C. below the melting point of the yarn 6 has proved to be especially advantageous. In the case of a relatively long dwell time (relatively large distances between the pairs of rolls, relatively large roll diameters, different yarn speeds with the same degree of drawing) for thermal transformation, the temperature range during relaxation can also be in the range of 5° C. to 15° C. In order to obtain the desired yarn quality, the temperature range during relaxation can be very slightly closer to the melting point than the temperature range during drawing.

The second relaxation zone is formed by the pairs of rolls 11 and 12, the yarn 6 being guided around the pairs of rolls 12 at the lower speed of 3150 m/min. In this case too, a temperature slightly below the melting temperature of the yarn 6 is maintained, analogously to the first relaxation zone.

In this exemplary embodiment a third relaxation step takes place between the pair of rolls 12 and the reel device 14, wherein the yarn, cooled, is wound up at a speed of 3100 m/min. The degree of relaxation between the pair of draw rolls 10 and the reel device 14 is 9%.

Alternatively, the third relaxation step can also be effected with a sixth pair of rolls (not shown) arranged between the pair of rolls 12 and the reel device 14. The relaxation can be intensified by the reel device 14, by the reel device winding up the yarn 6 at a lower speed than the speed at which the latter travels around the pair of rolls 12 or around the last pair of rolls. Depending upon the desired yarn properties, the reel device can, however, also be operated at the same speed as or at a higher speed than the last pair of rolls. For example, the speed range of the reel device can be from 0.8% to 1.2% higher than the speed of the last pair of rolls. In a further embodiment, the reel device may be operated at a speed 1% to 3% lower than the last pair of rolls.

According to the invention, the relaxation takes place in three stages at slightly below the melting temperature of the yarn, with the result that the molecule chains of the polyamide stabilise.

The relaxation of the yarn is effected by means of pairs of heated rolls, preferably duo rolls, in order to provide the yarn with a minimum dwell time for thermal treatment, during which the molecule chains of the polyamide are able to stabilise; the two rolls are driven and have substantially the same external diameter. The yarn 6 wraps several times, at least twice, around each roll. Alternatively, the use of mono rolls is possible, provided the dwell time does not fall below a specific value. The term "mono rolls" is used to denote pairs of rolls consisting of a driven roll having a large diameter and an idler roll having a small diameter that is carried along therewith.

In accordance with the exemplary embodiment using polyamide 6, in the case of a yarn composed of PA6 the following peripheral speeds and temperature values apply to the first to fifth pairs of draw rolls:

first pair of draw rolls 8: 817 m/min at 70° C.,
second pair of draw rolls 9: 2368 m/min at 155° C.,
third pair of draw rolls 10: 3409 m/min at 210° C.,
fourth pair of rolls 11: 3272 m/min at 215° C.,
fifth pair of rolls 12: 3150 m/min at 215° C.

Unlike the prior art, the total drawing of the yarn 6 is effected substantially between the pair of inlet rolls 7 and the third pair of draw rolls 10, since the subsequent speed of the yarn 6 at a very slightly higher temperature, slightly below the melting point, decreases, with the result that the molecule chains of the polyamide stabilise, leading to increased tenacity.

Following the last pair of rolls 12, the yarn 6 is fed via an interlacing means 13 to a reel device 14 and from there is wound onto a reel at a speed of, for example, 3100 m/min, that is to say at a lower speed than the speed at which the fifth pair of rolls 12 is operated. This also results in stabilisation and fixing of the crystallinity and the orientation of the molecules. Accordingly, after the third pair of draw rolls 10 the yarn 6 is no longer subjected to drawing but travels at a successively lower speed up to the reeling step.

Accordingly, in respect of the yarn 6 this results in a draw ratio of 4.3 from the inlet roll 7 up to the third pair of draw rolls 10 and a degree of relaxation of 9% from the pair of draw rolls 10 up to the reel device 14. The degree of drawing between the pair of inlet rolls 7 and the first pair of draw rolls 8 is 1.03.

It has been found that if PA6 undergoes an initial high degree of drawing between the pairs of draw rolls 8 and 9 with a rise in temperature from a temperature that is from 5° C. below to 30° C. above the glass transition temperature to a temperature of 130° C. to 180° C., which is 40° C. below the melting temperature of PA6, and a further high degree of drawing between the pairs of draw rolls 9 and 10 and a further rise in temperature to 210° C. with subsequent relaxation at a temperature slightly below the melting point, a yarn composed of the economical PA6 exhibits mechanical strength values otherwise achieved only by a yarn composed of the higher value PA6.6. Preferably there is a rise in temperature from 65° C. to 75° C. from the pair of draw rolls 8 to 150° C. to 170° C. at the pair of draw rolls 9, with the result that especially good values are achievable.

Surprisingly, this finding can also be applied to PA6.6, that is to say an increase in the temperatures at the pairs of draw rolls 8 and 9 from a temperature that is from 5° C. below to 30° C. above the glass transition temperature of PA6.6 at the pair of draw rolls 8 up to a temperature of 170° C. to 220° C. at the pair of draw rolls 9.

Using the process according to the invention, consistently stable values for hot-air shrinkage and tenacity are achieved even in the case of PA6.6.

EXAMPLE

In the following experimental examples, the first column (prior art) describes a process and a yarn according to the prior art. Columns 1-3 show the process according to the invention and a yarn according to the invention thereby produced.

In the Example, the hot-air shrinkage was determined at a temperature of 177° C. after 2 min holding time in accordance with ASTM D4974-04. It is therefore not comparable to testing methods carried out with a holding time of 4 hours, for example for use in tyre manufacture.

| | Test No. | | | |
|---|---|---|---|---|
| | Prior art | 1 | 2 | 3 |
| Test parameter | | | | |
| Polyamide type | PA6 with a relative viscosity of 3.0 measured in 90% HCOOH | | PA6 with a relative viscosity of 2.8 measured in 90% HCOOH | |

|  | Test No. | | | |
| --- | --- | --- | --- | --- |
|  | Prior art | 1 | 2 | 3 |
| Temperature at the spinneret in [° C.] | 292 | 290 | 290 | 290 |
| Inlet roll speed [m/min] | 730 | 793 | 793 | 775 |
| First draw roll speed [m/min] | 759 | 817 | 817 | 798 |
| First draw roll temperature [° C.] | 60 | 70 | 70 | 70 |
| Second draw roll speed [m/min] | 2245 | 2368 | 2368 | 2314 |
| Second draw roll temperature [° C.] | 155 | 155 | 155 | 155 |
| Third draw roll speed [m/min] | 3286 | 3409 | 3409 | 3409 |
| Third draw roll temperature [° C.] | 195 | 210 | 210 | 210 |
| Fourth draw roll speed [m/min] | 3080 | 3272 | 3272 | 3272 |
| Fourth draw roll temperature [° C.] | 170 | 215 | 215 | 215 |
| Fifth draw roll speed [m/min] | — | 3150 | 3150 | 3150 |
| Fifth draw roll temperature [° C.] | — | 215 | 215 | 215 |
| Reel device speed [m/min] | 3045 | 3100 | 3130 | 3125 |
| Reel tension [cN] | 60 | 60 | 65 | 65 |
| Laboratory tests | | | | |
| Titre [d/tex] | 481 | 482 | 482 | 472 |
| Number of filaments | 140 | 140 | 140 | 140 |
| Elongation at break [%] | 22.3 | 26.7 | 25.9 | 26.2 |
| Tensile strength [cN/tex] | 83.5 | 81.4 | 81.6 | 84.7 |
| Hot-air shrinkage 177° C., 2 min [%] | 8.9 | 3.7 | 4.4 | 4.6 |

In the prior art the polyamide is drawn off by the inlet roll 7 at a speed of 730 m/min at a temperature of 60° C. and up to the third draw roll 10 is subjected to drawing at a speed of 3286 m/min at a temperature of 195° C., which corresponds to 4.5-fold drawing. The relaxation is effected with a single drawing mechanism, the fourth draw roll, at a speed of 3080 m/min at a temperature of 170° C., and further to the reel device at a speed of 3045 m/min, which corresponds to a total relaxation of −7.3%.

As a result, the elongation at break is, at 22.3%, significantly lower than in accordance with the lowest value according to the invention of 25.9%, and the hot-air shrinkage is double the value at 8.9%, whereas the values according to the invention lie between 3.7 and 4.6%.

According to the invention, after a first multi-stage drawing step, which is followed by an at least three-stage relaxation step, the desired tenacity values for a PA6, PA6.6 or a comparable polyamide are achievable. The temperature in the last drawing stage is 5° C. to 20° C. slightly below the melting point of the yarn. During the at least three-stage relaxation step, the temperature is likewise kept just below the melting point of the yarn, namely 5° C. to 15° C., preferably 5° C. to 8° C.

It will be understood that the above description of the present invention is susceptible to various modifications, changes and adaptations, and that the same are intended to be comprehended within the meaning and range of equivalents of the appended claims.

The invention claimed is:

1. A process for the production of a low-shrinkage aliphatic polyamide yarn, comprising:
   extruding polyamide through a spinneret to form filaments;
   then cooling and combining the filaments to form at least one yarn;
   subjecting the at least one yarn to drawing between the spinneret and a pair of inlet rolls;
   then subjecting the at least one yarn in a further multi-stage drawing step to 4-fold to 6-fold drawing by at least three pairs of heatable draw rolls that successively heat the yarn, with the temperature of the pairs of heatable draw rolls being successively increased, from a temperature for the first pair of heatable draw rolls that is from 5° C. below to 30° C. above the glass transition temperature of the yarn, with the temperature of the second pair of heatable draw rolls being from 130° C., to 40° C. below a melting temperature of the yarn, and with at least a last pair of the at least three pairs of heatable draw rolls having a temperature of 5° C. to 20° C. below the melting point of the yarn;
   relaxing the yarn by from 4% to 10% in a subsequent at least three-stage relaxation zone and while keeping the yarn in a temperature range of 5° C. to 15° C. below a melting point of the yarn, wherein the at least three-stage relaxation zone is formed by at least first and second pairs of rolls and a reel device following the at least first and second pairs of rolls;
   operating the reel device at a speed 1% to 3% lower than the last pair of rolls in the relaxation zone; and
   subsequently winding up the yarn on the reel device.

2. The process according to claim 1, wherein the polyamide comprises at least 90% by weight, monomeric units derived from caprolactam, or monomeric units derived from hexamethylenediamine and adipic acid (AH salt), or mixtures thereof.

3. The process according to claim 1, wherein in the multi-stage drawing step, includes subjecting the yarn to 4-fold to 5.5-fold drawing by the pairs of heatable draw rolls.

4. The process according to claim 1, wherein the last pair of draw rolls has a temperature of 5° C. to 10° C. below a melting point of the yarn.

5. The process according to claim 1, wherein the relaxing step includes relaxing the yarn by 8% to 10% in the at least three-stage relaxation zone.

6. The process according to claim 1, wherein in the at least three-stage relaxation zone, keeping the yarn in a temperature range of 5° C. to 8° C. below a melting point of the yarn.

* * * * *